United States Patent
Park et al.

(10) Patent No.: US 7,167,218 B1
(45) Date of Patent: Jan. 23, 2007

(54) LIQUID CRYSTAL DISPLAY AND METHOD OF MANUFACTURE

(75) Inventors: Sung-Il Park, GooMi-si (KR); Won-Gyun Youn, GooMi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/550,282

(22) Filed: Apr. 14, 2000

(30) Foreign Application Priority Data

Apr. 15, 1999 (KR) ................ 1999-13365

(51) Int. Cl.
  *G02F 1/136* (2006.01)
  *G02F 1/1333* (2006.01)
  *G02F 1/1335* (2006.01)

(52) U.S. Cl. .................. 349/44; 349/42; 349/110; 349/113

(58) Field of Classification Search ......... 349/113, 349/110, 42, 44
See application file for complete search history.

(56) References Cited

U.S. PATENT DOCUMENTS

| | | | |
|---|---|---|---|
| 5,724,107 A * | 3/1998 | Nishikawa et al. ........... 349/38 |
| 5,870,157 A * | 2/1999 | Shimada et al. ............ 349/106 |
| 5,877,830 A * | 3/1999 | Shimada et al. ............ 349/113 |
| 6,061,110 A * | 5/2000 | Hisatake et al. ........... 349/113 |
| 6,100,954 A * | 8/2000 | Kim et al. ................. 349/138 |
| 6,130,736 A * | 10/2000 | Sasaki et al. .............. 349/122 |
| 6,160,598 A * | 12/2000 | Lyu ........................... 349/111 |
| 6,172,723 B1 * | 1/2001 | Inoue et al. ................. 349/95 |
| 6,172,728 B1 * | 1/2001 | Hiraishi ..................... 349/139 |
| 6,259,200 B1 * | 7/2001 | Morita et al. .............. 313/498 |
| 6,320,636 B2 * | 11/2001 | Zhang et al. .............. 349/139 |
| 6,503,772 B1 * | 1/2003 | Ohtsu et al. ................ 438/30 |

* cited by examiner

*Primary Examiner*—Huyen Ngo
*Assistant Examiner*—Mike Qi
(74) *Attorney, Agent, or Firm*—Birch, Stewart, Kolasch & Birch, LLP

(57) ABSTRACT

The liquid crystal display (LCD) includes a gate line formed on a transparent substrate and a data line crossing the gate line. An insulating layer electrically insulates the data line from the gate line. A thin film transistor is formed at an intersection of the gate line and the data line, and is connected to the gate line and the data line. A low reflective layer is formed on at least a portion of the data line.

19 Claims, 6 Drawing Sheets

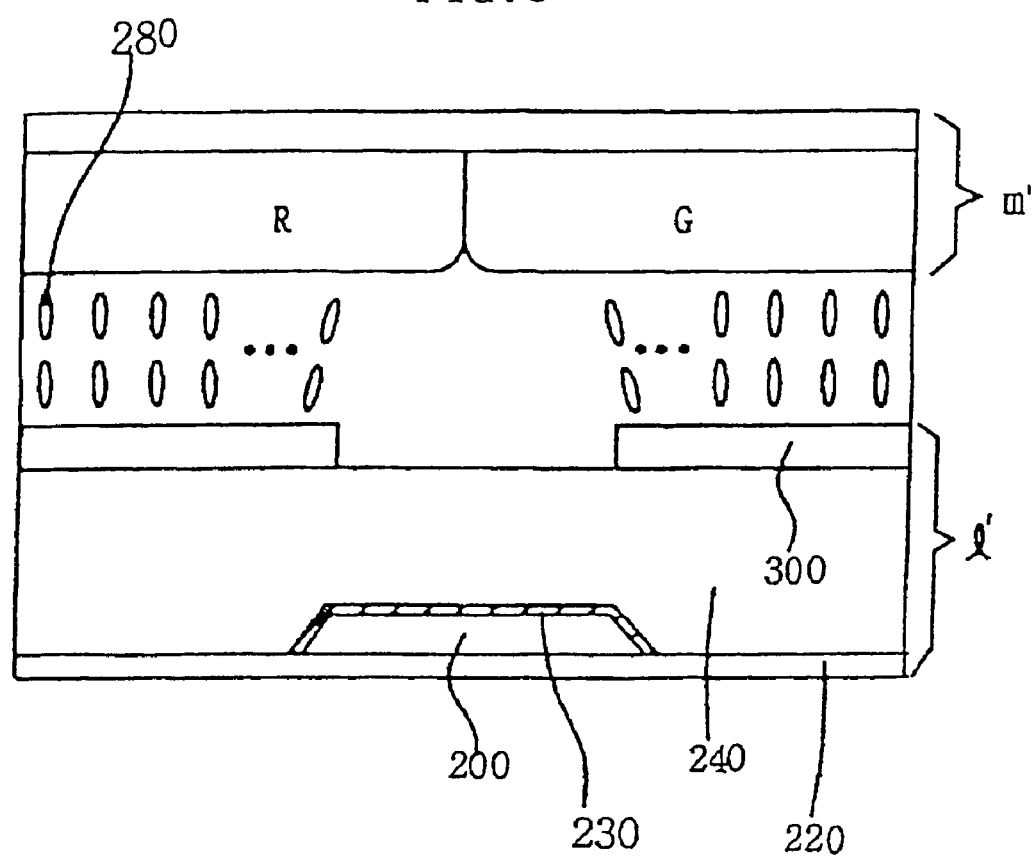

LIQUID CRYSTAL DISPLAY AND METHOD OF MANUFACTURE

BACKGROUND OF THE INVENTION

1. Field of Invention

The present invention relates to liquid crystal displays, more particularly, to a thin film transistor-liquid crystal display, which prevents the degradation of contrast and improves an aperture ratio thereof, and its method of manufacture.

2. Discussion of Related Art

A liquid crystal display (LCD) is fabricated to provide a state of an image which lessens eye fatigue due to external light reflection and relieves rejection symptoms (an aspect of human engineering). Specifically, LCDs for business or personal uses need a low-reflection technique that functions under a variety of external light conditions.

FIG. 1 shows a layout for a unit pixel of a thin film transistor-liquid crystal display (hereinafter abbreviated TFT-LCD), and FIG. 2 shows a cross-sectional view of the TFT in FIG. 1 along the line II—II, and FIG. 3 shows a cross-sectional view bisecting the TFT-LCD in FIG. 1 along the line III—III.

FIG. 4 shows a cross-sectional view of a portion of a completed TFT-LCD according to the related art. The TFT-LCD, as shown in FIG. 1 and FIG. 4, includes a TFT array plate l, where a TFT and a pixel electrode 30 are arranged; a color filter plate m including a black matrix 29; a color filter (which is denoted by R and G), a common electrode (not shown in the drawing); and liquid crystal 28 filling a space between the plates l and m.

As most LCD manufacturers use a bottom gated TFT—an inverted stagger structure, an LCD according to the related art having a TFT of the inverted stagger structure will be explained in the following description. Referring to FIG. 1, a gate line 10 is disposed horizontally on a transparent substrate 1, which is a TFT array substrate, while a data line 20, which is insulated from and crosses the gate line 10, is arranged perpendicular to the gate line 10. A gate electrode 14 protrudes from the gate line 10 in the direction of the data line 20. As shown in FIG. 2, the gate electrode 14, a gate insulating layer 22 and then an active layer 12 are formed. In the active layer 12, a channel region(not shown in the drawing) is formed over the gate electrode 14, while a source region and a drain region(not shown in the drawing) are defined at both sides of the channel region.

As shown in FIG. 1 and FIG. 2, a source electrode 16, which protrudes from the data line 20, is connected to the source region of the active layer 12, and a drain electrode 18 is connected to the drain region of the active layer 12.

As shown in FIG. 2 and FIG. 3, a passivation layer 24 covers the substrate 1, and includes a contact hole exposing the drain electrode 18. The passivation layer 24 is an insulator having a low dielectric constant. A pixel electrode 30, which covers the contact hole, is connected to the drain electrode 18 via the contact hole. The pixel electrode 30, as shown in FIG. 1 and FIG. 3, may overlap with the data line 20 to increase the aperture ratio.

Referring to FIG. 1 and FIG. 4, reference numeral 32 denotes a window of a black matrix 29, through which light actually passes. In the LCD of the related art, as shown in FIG. 4, a common electrode (not shown) and the respective color filters (denoted by 'R' and 'G') are formed on the color filter substrate 31, and the black matrix 29 is formed between the color filters R and G. The black matrix 29 is formed of a Cr/CrOx layer (or a metal layer) by sputtering Cr, and prevents light leaking from other regions of the color filters except the window 32 (see FIG. 1). The black matrix 29, which is formed by depositing a metal layer by sputtering, has reduced thickness and low electric resistance. Thus, the cost of fabricating the black matrix 29 is expensive.

While the black matrix 29 reduces degradation such as cross-talk because of its low resistance, the black matrix 29 is affected greatly by external light reflection due to its high reflectivity. Accordingly, Cr/CrOx is widely used for black matrix 29 to reduce such influences because the reflectivity of CrOx is about 3% while that of Cr is 60%.

The aperture ratio of the LCD of the related art is limited because of the LCD's constitution. And, although the LCD of the related art has low reflectivity by using Cr/CrOx as a black matrix, the contrast, which is the ratio of brightness and darkness of an image, is reduced because of the high reflectivity of the data line 20.

SUMMARY OF THE INVENTION

The liquid crystal display according to the present invention includes a gate line and a data line formed on a transparent substrate wherein the gate and data lines are electrically insulated from one another. A thin film transistor, formed at an intersection of the gate and data lines, is connected to the gate and data lines. A low reflective layer is formed on at least a portion of the data line to eliminate problems with the high reflectivity thereof.

The liquid crystal display also includes a passivation layer formed over the gate and data lines, the thin film transistor and the low reflective layer. A pixel electrode is formed on the passivation film, and is connected to the thin film transistor via a contact hole in the passivation film. In a preferred embodiment, the pixel electrode is formed over a portion of the data line and/or gate line to improve the aperture ratio of the liquid crystal display.

A color filter substrate opposes the transparent substrate, and has color filters formed thereon. Unlike conventional liquid crystal displays, the liquid crystal display according to the present invention does not require a black matrix. The low reflective layer eliminates the need for a black matrix on the color filter substrate. Liquid crystal is sealed between the color filter substrate and the transparent substrate.

BRIEF DESCRIPTION OF THE DRAWINGS

The accompanying drawings, which are included to provide a further understanding of the invention and are incorporated in and constitute a part of this application, illustrate embodiments of the invention, wherein like reference numerals denote like elements, and together with the description serve to explain the principles of the invention.

In the drawings:

FIG. 8 shows a cross-sectional view of a portion of a completed TFT-LCD according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 5:
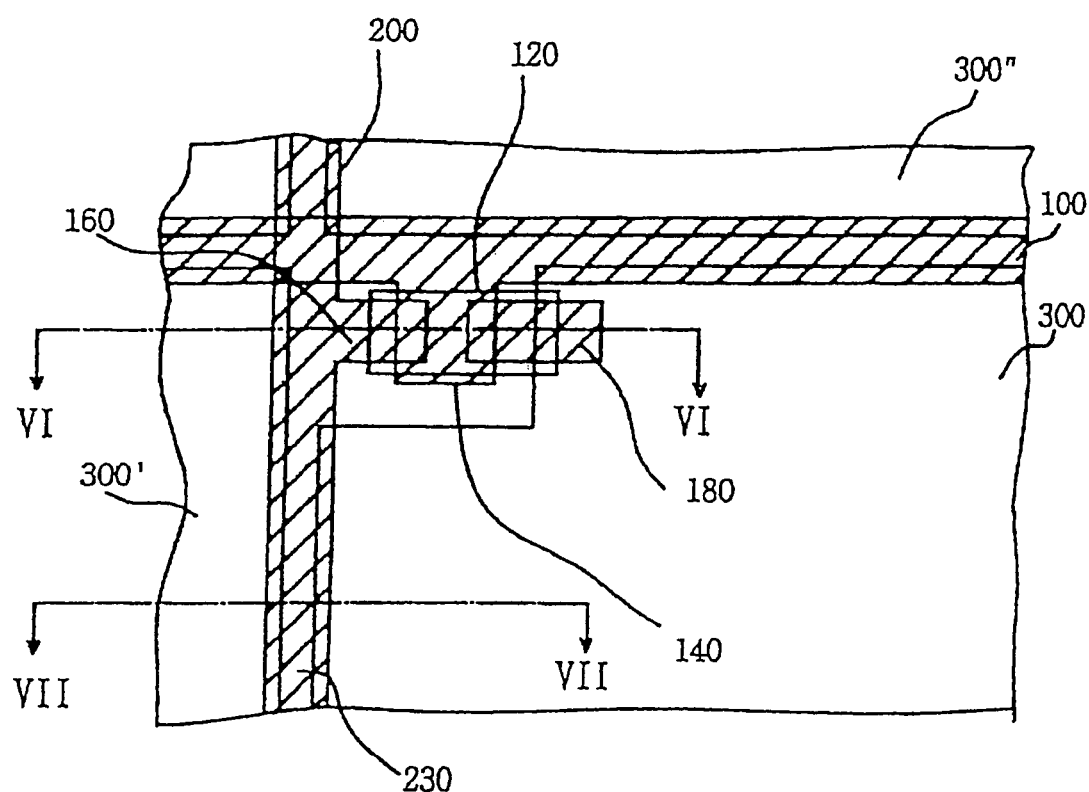
FIG. 5 shows a layout for a unit pixel of a thin film transistor-liquid crystal display according to an embodiment of the present invention.
Figure 6:
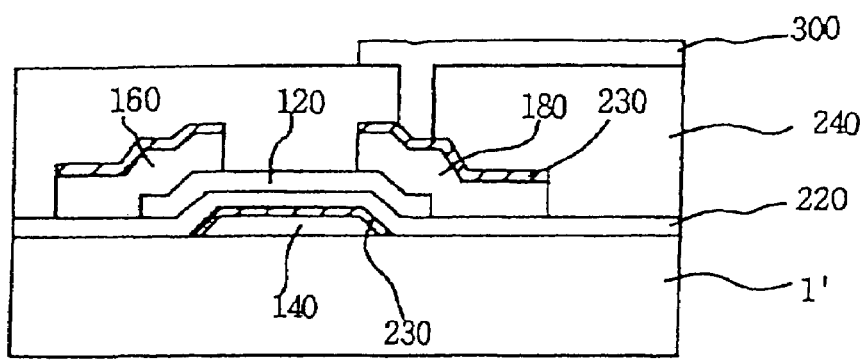
FIG. 6 shows a cross-sectional view of a TFT in FIG. 5 along the line VI—VI.
Figure 7:
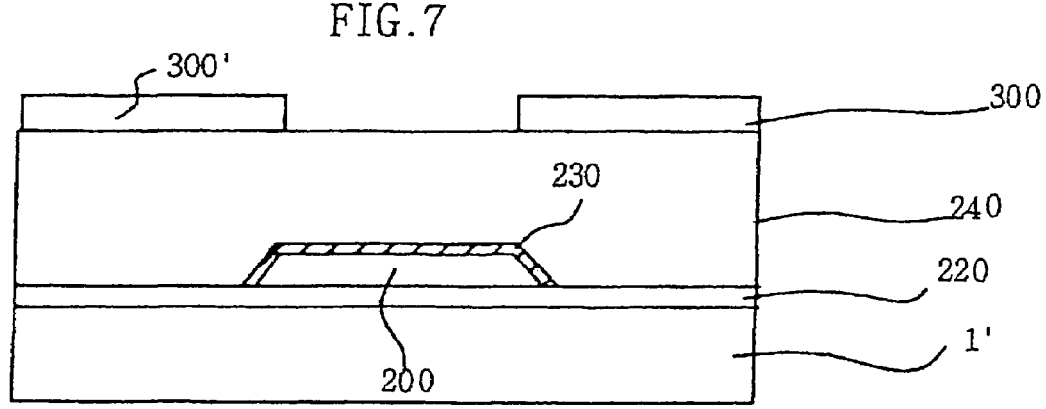
FIG. 7 shows a cross-sectional view bisecting the TFT-LCD in FIG. 5 along the line VII—VII.

FIG. 5 shows a layout for a unit pixel of a thin film transistor-liquid crystal display according to an embodiment of the present invention, FIG. 6 shows a cross-sectional view of a TFT in FIG. 5 along the line VI—VI, FIG. 7 shows a cross-sectional view bisecting the TFT-LCD in FIG. 5 along the line VII—VII and FIG. 8 shows a cross-sectional view of a portion of a completed TFT-LCD according to the embodiment of the present invention.

As shown in FIG. 5, a gate line 100 is disposed horizontally on a transparent substrate 1', which is a TFT array substrate, while a data line 200, which is insulated from and crosses the gate line 100, is arranged perpendicular to the gate line 100.

A gate electrode 140 protrudes from the gate line 100 in the direction of the data line 200. As shown in FIG. 5 and FIG. 6, a low reflective layer 230 covers the gate line 100 and the gate electrode 140 (slash lines in FIG. 5). As further shown in FIG. 6, a gate insulating layer 220 and then an active layer 120 are formed. In the active layer 120, a channel region (not shown in the drawing) is formed over the gate electrode 140, while a source region and a drain region(not shown in the drawing) are defined at both sides of the channel region.

As shown in FIGS. 5 and 6, a source electrode 160, which protrudes from the data line 200, is connected to the source region of the active layer 120, and a drain electrode 180 is connected to the drain region of the active layer 120. The source electrode 160, the drain electrode 180 and the data line 200 are also covered with the low reflective layer 230 (slash lines in FIG. 5).

As shown in FIG. 6 and FIG. 7, a passivation layer 240 covers the substrate 1', and includes a contact hole exposing the drain electrode 180.

A pixel electrode 300 (and/or pixel electrodes 300' or 300"—see FIG. 5) formed on the passivation layer 240 overlaps the data line 200 and the gate line 100, and partially connects to the drain electrode 180 via the contact hole.

Figure 1:
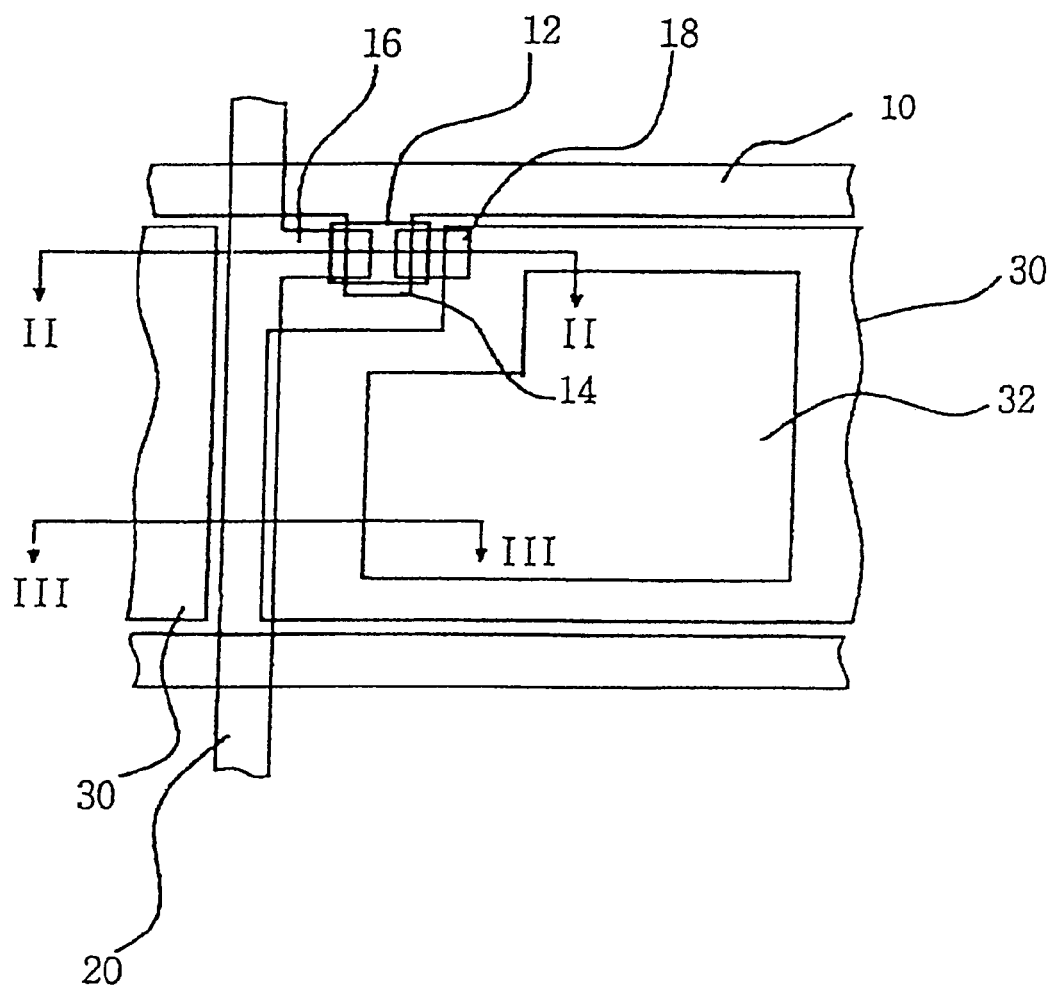
FIG. 1 shows a layout for a unit pixel of a general thin film transistor-liquid crystal display.
Figure 2:
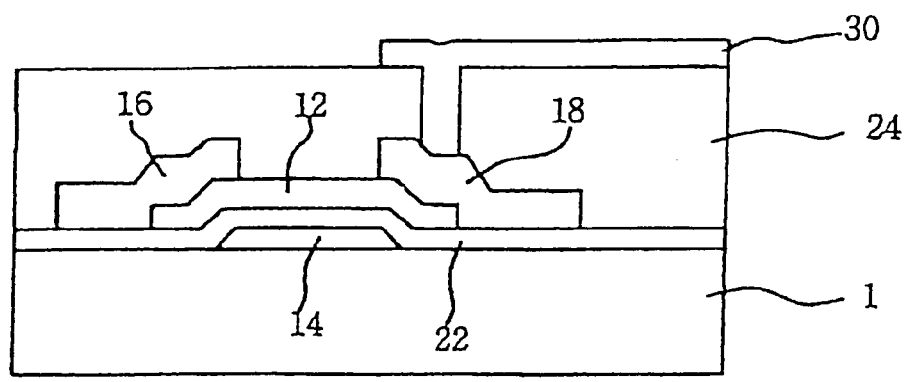
FIG. 2 shows a cross-sectional view of a TFT in FIG. 1 along the line II—II.
Figure 3:
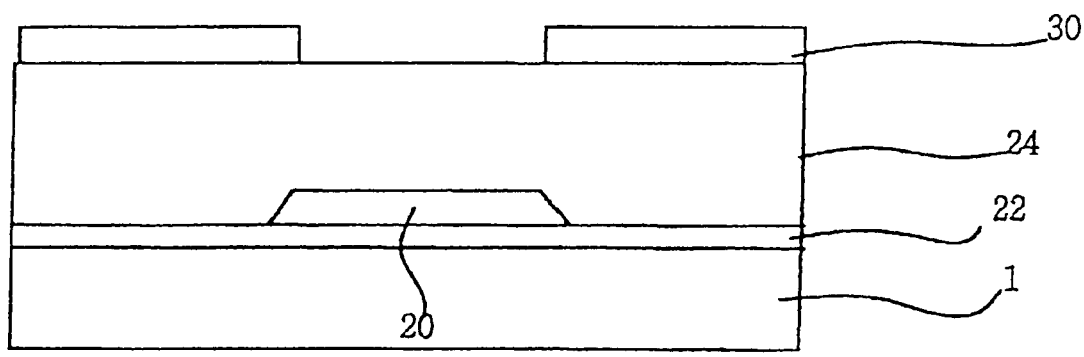
FIG. 3 shows a cross-sectional view bisecting the TFT-LCD in FIG. 1 along the line III—III.
Figure 4:
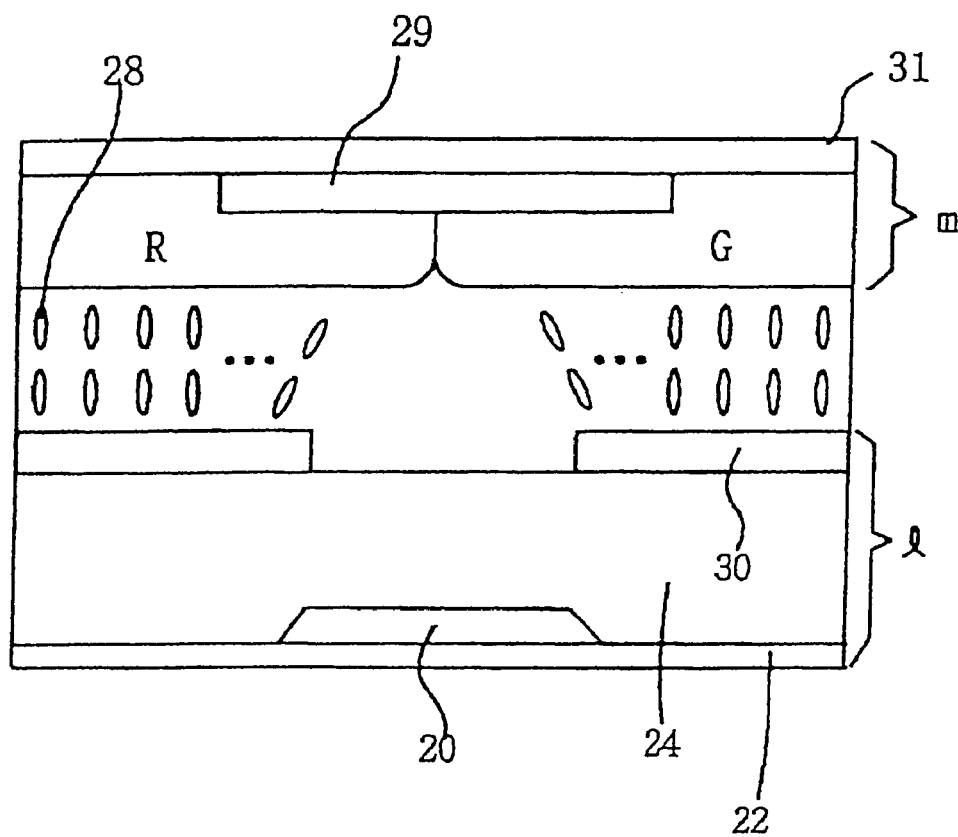
FIG. 4 shows another cross-sectional view of a portion of a completed TFT-LCD according to the related art.

As shown in FIG. 1, in a preferred embodiment, the pixel electrode 300' to the left of the data line 200 partially overlaps the data line 200, while the pixel electrode 300 to the right of the data line 200 also partially overlaps the data line 200. And, the pixel electrode 300" above the gate line 100 partially overlaps the gate line 100, while the pixel electrode 300 below the gate line 100 partially overlaps the gate line 100.

In the completed LCD of the present invention, as partially shown in FIG. 8, a common electrode (not shown) and the respective color filters(denoted by 'R' and 'G') are formed on the color filter substrate 290, but a black matrix is not formed. A space between the TFT array plate l' and the color filter plate m' of the LCD is filled with a liquid crystal 280 and sealed.

A method of fabricating a liquid crystal display according to the present invention will be explained by referring to FIG. 6 and FIG. 7. A metal layer is formed on the transparent substrate 1' by depositing metal such as Al, Mo or the like by sputtering. The gate line 100 and the gate electrode 140 are formed by patterning the metal layer. The gate line 100 and the gate electrode 140 are usually formed of Al because of its low electric resistance to reduce RC delay, which is critical to the TFT-LCD operation. However, pure Al is vulnerable to chemical degradation and imperfections such as hillocks and the like occur during thermal treatment. Therefore, an Al alloy or a stacked layer is used instead of pure Al. Next, a Cr/CrOx layer is formed by forming Cr on the above structure and by carrying out thermal oxidation on the Cr. The low-reflective layer 230 is then formed by patterning the Cr/CrOx layer to cover the gateline 100 and the gate electrode 140.

On the transparent substrate 1', the gate insulating layer 220 is formed over the gate electrode 140, and an amorphous silicon layer (for a TFT channel) and a silicon layer doped with impurities (as an ohmic contact layer for source/drain electrodes) are deposited successively. Then, the active layer 120 is formed by patterning the amorphous silicon layer and the silicon layer doped with impurities. In this case, the remaining silicon layer doped with impurities becomes an ohmic contact layer(not shown in the drawing). Also, the gate insulating layer 220 is mainly formed of silicon nitride (SiNx).

After a metal layer has been formed on the above structure by depositing metal such as Cr or the like by sputtering, the data line 200 crossing with the gate line 100, the source electrode 160 connected to the source region of the active layer 120, and the drain electrode 180, which is separated from and confronts the source electrode 160, are formed by patterning the metal layer. While not shown in the drawings, a portion of the silicon layer doped with impurities is also etched to pattern the source/drain electrodes and separate the respective source/drain regions of the active layer 120.

Next, a Cr/CrOx layer is formed by forming Cr on the above structure and by carrying out thermal oxidation on the Cr. The low-reflective layer 230 is then again formed by patterning the Cr/CrOx layer to cover the data line 200, and the source and drain electrodes 160 and 180. The low-reflective layer 230 lowers the reflectivity of the gateline 100, the gate electrode 140, the data line 200, the source electrode 160 and the drain electrode 180 to under 3%.

Then, the passivation layer 240 is formed over the above structure by chemical vapor deposition. The passivation layer 240 is formed of one of silicon nitride, which has a low dielectric constant, and an organic insulator such as acryl, BCB(BenzoCycloButene), PFCB(perflourocyvclobutane), FPAE(Flouropolyarrylether), cytop and para-xylene. A contact hole exposing the drain electrode 180 is formed by patterning the passivation layer 240 through etching. Afterwards, ITO(indium tin oxide) is deposited on the passivation layer 240, and a pixel electrode 300 connected to the drain electrode 180 through the contact hole is formed by patterning the ITO through etching. Accordingly, the TFT array plate l' according to the present invention is completed.

A color filter plate m' of the present invention is constructed with the respective color filters (denoted by R or G) and without a black matrix by any well-known method.

Then, the liquid crystal 280 is injected between the TFT array plate l' and the color filter plate m', and an embodiment of an LCD according to the present invention is completed by sealing the plates l' and m'.

The LCD according to the present invention is constructed without a black matrix and with a structure such that a pixel electrode partially overlaps with the data and gate lines in the TFT array substrate. Moreover, a low-reflective layer covers the data and gate lines. Accordingly, the present invention increases an aperture ratio by introducing a structure of the color filter plate without a black matrix and partially overlapping the data and gate lines with the pixel electrode.

The low reflective layer 230 operates as a black matrix for blocking light filtered by the color filters from leaking and lowers reflectivity of the data and gate lines during light irradiation.

It will be apparent to those skilled in the art that various modifications and variations can be made in a liquid crystal display of the present invention without departing from the spirit or scope of the invention. Thus, it is intended that the present invention cover the modifications and variations of the described embodiments provided they come within the scope of the appended claims and their equivalents.

What is claimed is:

1. A liquid crystal display (LCD), comprising:
   a gate line formed on a transparent substrate;
   a data line crossing said gate line and formed on said transparent substrate;
   an insulating layer electrically insulating said data line from said gate line;
   a thin film transistor formed at an intersection of said gate line and said data line, and connected to said gate line and said data line, the thin film transistor being disposed in an area having a channel area, a source area and a drain area;
   a passivation layer formed over the thin film transistor;
   a pixel electrode having portions thereof formed on the surface of the passivation layer, but not over the thin film transistor;
   a low reflective layer covering at least a portion of at least one of said gate line and said data line and covering the area to shield the light passing the gate line, the data line and the area; and
   an upper substrate located above the pixel electrode, wherein an area between said pixel electrode and said upper substrate, and above said low reflective layer, is free of any black layer or light shielding layer.

2. The LCD of claim 1, wherein said low reflective layer has a light reflectivity of 3% or less.

3. The LCD of claim 1, wherein said low reflective layer is formed of CrOx.

4. The LCD of claim 1, wherein said passivation layer formed over said gate line, said data line, said low reflective layer and said pixel electrode formed on said passivation layer is connected via a contact hole in said passivation layer to said thin film transistor.

5. The LCD of claim 4, wherein said pixel electrode is formed over a portion of said data line.

6. The LCD of claim 4, wherein said pixel electrode is formed over a portion of said gate line.

7. The LCD of claim 4, further comprising:
   a color filter substrate with color filters formed thereon; and
   liquid crystal sealed between said color filter substrate and said transparent substrate.

8. The LCD of claim 1, wherein the thin film transistor further includes:
   a gate electrode connected to said gate line, said gate electrode being covered with the channel region; and
   a source electrode, and a drain electrode connected to a drain line, the source electrode and the drain electrode being respectively covered with the low reflective layer.

9. The LCD of claim 8, wherein said low reflective layer is formed on said gate electrode.

10. The LCD of claim 8, wherein said thin film transistor includes a source electrode and a drain electrode; and
    said low reflective layer is formed on said source and drain electrodes.

11. A method of manufacturing a liquid crystal display, comprising:
    forming a gate line and a gate electrode of a thin film transistor to be connected with the gate line on a transparent substrate;
    forming an insulating layer electrically insulating said gate line and the gate electrode;
    forming a data line and source electrode and drain electrode over said transparent substrate the source electrode and the drain electrode being respectively disposed in a source area and a drain area, at least one electrode of the source electrode and the drain electrode being connected with the data line;
    forming a passivation layer over the thin film transistor;
    forming a pixel electrode with portions thereof on the surface of the passivation layer, but not over the thin film transistor;
    first forming a low reflective layer over at least a portion of at least one of said gate line and said data line and on the channel region, the source area and the drain area;
    forming an upper substrate above the pixel electrode, wherein an area between said pixel electrode and said upper substrate, and above said low reflective layer, is free of any black layer or light shielding layer.

12. The method of claim 11, wherein the step of first forming the low reflective layer includes the step of forming a low reflective layer covering said gate electrode.

13. The method of claim 11, wherein said low reflective layer is formed covering said source electrode.

14. The method of claim 11, wherein said low reflective layer has a light reflectivity of 3% or less.

15. The method of claim 11, wherein said low reflective layer is formed of CrOx.

16. A method of manufacturing a liquid crystal display, comprising:
    forming a gate line and gate electrode connected thereto on a transparent substrate;
    forming an insulating layer over said gate line and gate electrode;
    forming a semiconductor layer over said gate electrode;
    forming a data line crossing said gate line, a source electrode connected to said data line and on a first portion of said semiconductor layer, and a drain electrode on a second portion of said semiconductor layer;
    forming a low reflective layer over at least a portion of at least one of said gate line and said data line and on the first and second portions;
    forming a passivation layer having a contact hole exposing said drain electrode over said transparent substrate;
    forming a pixel electrode with portions thereof disposed on said passivation layer but not over the thin film transistor, and connected to said drain electrode via said contact hole; and
    forming an upper substrate above the pixel electrode, wherein an area between said pixel electrode and said upper substrate, and above said low reflective layer, is free of any black layer or light shielding.

17. The method of claim 16, wherein said forming a pixel electrode step forms said pixel electrode to overlap a portion of said data line.

18. The method of claim 16, wherein said forming a pixel electrode step forms said pixel electrode to overlap a portion of said gate line.

19. The method of claim 16, further comprising:
forming a color filter on a color filter substrate; and
sealing the liquid crystal between said color filter substrate and said transparent substrate.

* * * * *